(12) United States Patent
Lundin (10) Patent No.: US 8,132,999 B2
(45) Date of Patent: Mar. 13, 2012

(54) SEMI TRAILER DOLLY

(75) Inventor: Richard E. Lundin, Park Ridge, IL (US)

(73) Assignee: Lundin Recovery Equipment LLC, Park Ridge, IL (US)

( * ) Notice: Subject to any disclaimer, the term of this patent is extended or adjusted under 35 U.S.C. 154(b) by 348 days.

(21) Appl. No.: 11/958,950

(22) Filed: Dec. 18, 2007

(65) Prior Publication Data

US 2009/0155035 A1    Jun. 18, 2009

(51) Int. Cl.
 *B62D 13/04*    (2006.01)
(52) U.S. Cl. .................................. 414/495; 280/79.4
(58) Field of Classification Search .................. 280/442, 280/79.4; 414/495
See application file for complete search history.

(56) References Cited

U.S. PATENT DOCUMENTS

| | | | |
|---|---|---|---|
| 2,571,234 A | | 10/1951 | Guest |
| 3,575,444 A | * | 4/1971 | Veenema et al. ............... 280/408 |
| 3,884,494 A | | 5/1975 | Ashby et al. |
| 4,252,336 A | * | 2/1981 | Hubbard ....................... 280/432 |
| 4,320,607 A | | 3/1982 | Eubank |
| 4,524,841 A | * | 6/1985 | Waggoner .................... 280/81.6 |
| 4,555,214 A | | 11/1985 | Morton |
| 4,599,968 A | | 7/1986 | Ryder et al. |
| 4,708,358 A | | 11/1987 | Gehman et al. |
| 4,759,563 A | | 7/1988 | Nash |
| 4,768,802 A | | 9/1988 | Winkler |
| 4,856,804 A | | 8/1989 | Nash |
| 4,861,221 A | | 8/1989 | Krisa |
| 5,013,209 A | * | 5/1991 | DeMichele et al. .......... 414/563 |
| 5,098,115 A | | 3/1992 | Haire et al. |
| 5,370,414 A | | 12/1994 | Tucker |
| 5,477,937 A | * | 12/1995 | Chagnon ..................... 180/24.01 |
| 5,628,607 A | * | 5/1997 | Kyzer et al. ................... 414/495 |
| 5,655,733 A | * | 8/1997 | Roach ............................ 244/50 |
| 5,660,518 A | | 8/1997 | Meier |
| 5,722,677 A | | 3/1998 | Lichter et al. |
| 5,727,920 A | | 3/1998 | Hull et al. |
| 5,785,341 A | | 7/1998 | Fenton |
| 5,839,876 A | | 11/1998 | McCarthy et al. |

(Continued)

FOREIGN PATENT DOCUMENTS

GB    1563796    4/1980

OTHER PUBLICATIONS

U.S. Appl. No. 12/166,710, filed Jul. 2, 2008, Richard Lundin.

(Continued)

*Primary Examiner* — Charles A Fox
(74) *Attorney, Agent, or Firm* — John S. Paniaguas; Katten Muchin Rosenman LLP (57) ABSTRACT

A dolly is disclosed for a semi-trailer that has a compromised structure due to a load shift or an accident. The dolly provides transverse support between the axles. The dolly includes a lift mechanism that provides a uniform lifting force, transversely to a trailer between the axles where a structural failure of the trailer is likely to occur. The dolly includes a removable saddle and a wheeled portion that includes a lift. The removable saddle can be removed from the dolly and positioned under the trailer. A tow truck boom winch can then be used to lift the saddle and enable the wheeled portion to be positioned under the trailer. Adjustable lift stands on the wheeled portion enable the lift stands to be mechanically secured under the saddle to support the trailer.

14 Claims, 6 Drawing Sheets

U.S. PATENT DOCUMENTS

| | | |
|---|---|---|
| 5,845,920 A | 12/1998 | Hill |
| 5,863,059 A | 1/1999 | Waggoner |
| 6,036,217 A | 3/2000 | Burkhart et al. |
| 6,120,051 A | 9/2000 | Lichter et al. |
| 6,170,849 B1 | 1/2001 | McCall |
| 6,290,248 B1 | 9/2001 | Yrigoyen |
| 6,361,023 B1 | 3/2002 | Peavler |
| 6,364,324 B1 * | 4/2002 | Buchanan ............ 280/15 |
| 6,450,523 B1 | 9/2002 | Masters et al. |
| 6,491,490 B1 | 12/2002 | Trobee |
| 6,623,028 B1 * | 9/2003 | Johnston ............ 280/656 |
| 6,663,131 B2 | 12/2003 | Evans |
| 6,681,535 B1 * | 1/2004 | Batchelor ............ 52/143 |
| 6,820,887 B1 | 11/2004 | Riggle |
| 6,843,487 B1 | 1/2005 | Lotman |
| 6,929,249 B1 | 8/2005 | Kim |
| 7,017,934 B2 | 3/2006 | Harris |
| 7,100,933 B2 | 9/2006 | Zackovich et al. |
| 7,275,345 B2 | 10/2007 | Cosse, III et al. |
| 7,275,753 B1 | 10/2007 | Ceccarelli et al. |
| 7,571,916 B2 * | 8/2009 | Skiles ............ 280/100 |
| 7,726,247 B2 * | 6/2010 | Neland ............ 108/55.1 |
| 2003/0132604 A1 | 7/2003 | Evans |
| 2004/0021290 A1 | 2/2004 | Hicks et al. |
| 2004/0197176 A1 | 10/2004 | Pate |
| 2005/0002767 A1 * | 1/2005 | Oosterhouse ............ 414/498 |
| 2005/0161903 A1 | 7/2005 | Harris |
| 2007/0035103 A1 | 2/2007 | Anton |
| 2009/0250901 A1 * | 10/2009 | Lundin ............ 280/442 |

OTHER PUBLICATIONS http://www.citationce.com/airlift.htm.

* cited by examiner

SEMI TRAILER DOLLY

BACKGROUND OF THE INVENTION

1. Field of the Invention

The present invention relates to a dolly for use with a semi-trailer that has a compromised structure due to a load shift or an accident and can also be used in applications where semi-trailers get stuck under low bridges.

2. Description of the Prior Art

Figure 11:
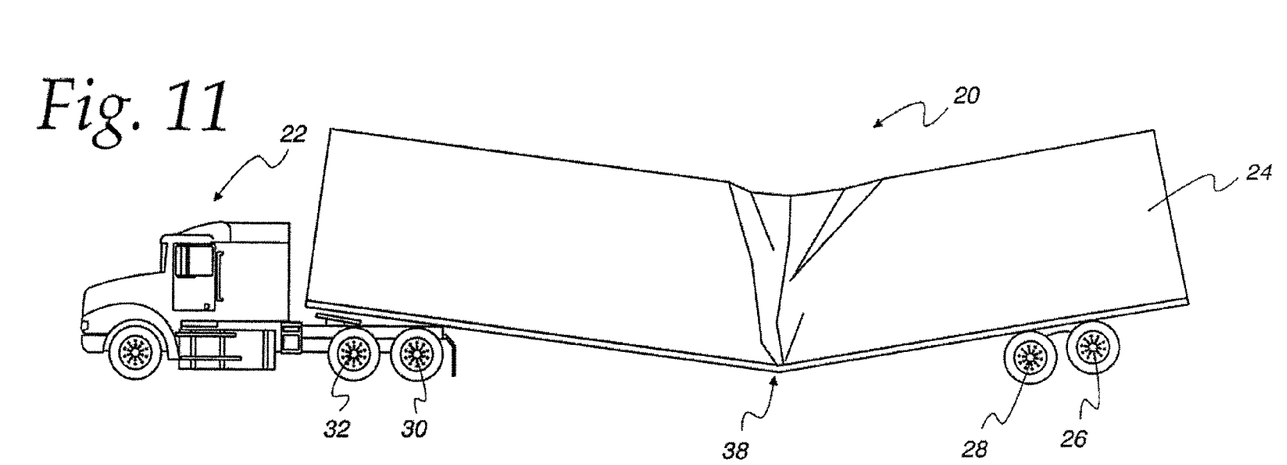
FIG. 11 is a side elevational view of a conventional tractor trailer illustrating damage to the trailer between the rear axle and the front of the trailer.

Various situations are known in which semi-trailers can not be transported in a normal fashion. For example, in some situations, the semi-trailers become structurally compromised due to a load shift or accident. In situations where there is a load shift, the structural integrity of the semi-trailer becomes compromised at an unsupported location between the front of the trailer, attached to the fifth wheel of the tractor and the rear axle, for example, as generally shown in FIG. 11. In such a situation, the load must first be removed from the trailer, typically by hand, onto another semi-trailer at the scene of the incident before the damaged semi-trailer can be moved. Unfortunately, the unloading of the damaged semi-trailer can cause additional structural damage and also create a personnel hazard since the incident can occur anywhere including a busy highway.

In yet other situations, semi-trailers are known to get stuck under low bridges. In normal situations, the height of a all bridges on a truck route is known to avoid such situations. On occasion, due to, for example, road construction, it is necessary for a truck to travel on an unplanned route. Should the semi-trailer get stuck under a low bridge, known methods for extricating the semi-trailer from the bridge. In particular, in a situation in which a semi-trailer gets stuck under a bridge, normally the load is removed, as discussed above. After the load is removed, the air is let out of all of the tires and the trailer is dragged out from under the bridge, likely causing damage to the tires and wheels and the trailer itself.

In both situations, the load must be removed from the semi-trailer first. After the load is removed, the semi-trailer must eventually be cleared from the roadway. Ideally, a dolly could be used to transport the semi-trailer without removing the load.

Various types of dollies for various applications are known in the art. These dollies are known to be useful for various purposes. Examples of such dollies are disclosed in U.S. Pat. Nos. 4,768,802; 5,727,920; 5,839,876; 6,290,248; 6,663,131; 6,843,487; 6,929,249; 7,275,345; and 7,275,753. Such dollies are also disclosed in UK Published Specification 1 563 796, all hereby incorporated by reference.

For example, U.S. Pat. Nos. 5,839,876; and 7,275,345 all relate to dollies for lifting heavy objects. In particular, U.S. Pat. No. 5,839,876 a dolly with a platform capable of lifting and rotating to enable eased transport of large, heavy objects, such as furniture and other heavy objects. The dolly includes casters for transport.

U.S. Pat. No. 7,275,345 discloses a lifting device used to support an object, such as furniture. The container has a false bottom with a hidden cavity containing a wheeled platform. The wheeled platform is exposed when the pneumatic lift bladder is filled and is height adjustable to preference and need (see column 1, lines 6-9; and column 2, lines 40-47). The lifting device includes casters for transport. Unfortunately none of the lifting devices disclosed in the above-mentioned patents are suitable for use with a semi-trailer with compromised structural integrity due to a load shift or an accident or for use in extricating a semi-trailer stuck under a low bridge.

Dollies are also known for use in transporting vehicles. For example, U.S. Pat. Nos. 5,727,920; 6,843,487; 6,929,249; 7,275,753 and UK Published Specification 1 563 796 all disclose dollies for use in transporting vehicles that have been disabled. These dollies all have lifting capability.

In particular, U.S. Pat. No. 5,727,920 discloses a configurable dolly which includes a frame with a trailer hitch on one end and an axle supporting a pair of wheels on the opposing end. The height of the frame can be adjusted as well as the distance between the wheels to enable the dolly to be configured for a variety of applications. The dolly disclosed in the '920 patent is adapted to carry an entire vehicle, such as a car, motorcycle or a boat after the dolly has been configured.

U.S. Pat. No. 6,843,487 discloses a lift structure that moveably supports an automobile with the loss of one wheel for transport. The device allows the automobile to travel along roadways or other surfaces to a repair facility. The device is secured in position to mobilize the vehicle. Attachment is achieved using gripping members that are pneumatically activated via an inflatable bladder. The lift structure disclosed in the '487 patent is adapted to provide support adjacent one wheel well 12 (FIG. 1) of a four wheeled vehicle.

U.S. Pat. No. 6,929,249 discloses a collapsible lift platform that engages a surface upon pneumatic expansion of an internal bladder. The air bladder can be filled by either an electric or mechanical (e.g. foot pump) air pump. The lift platform illustrated in FIGS. 1-5 appears to be used for lifting and supporting an area of an automobile frame, and can be stored in the vehicle trunk, as illustrated in FIG. 7. An optional embodiment, illustrated in FIG. 6, includes casters enable transport of the platform after lifting The device disclosed in FIG. 6 of the '240 patent is used to lift heavy furniture items, such as televisions.

U.S. Pat. No. 7,275,753 discloses a bi-axle dolly cradle useful for raising and towing disabled vehicles. The dolly is adapted to raise one end of a disabled vehicle. One end of the disabled vehicle is carried by the dolly which has two axles and two sets of wheels. Once the disabled vehicle is lifted onto the dolly, the other end of the disabled vehicle can be towed.

International patent GB 1,563,796 discloses an automobile retrieval system for use in applications when the damage to the vehicle makes it impossible to tow the vehicle or transport the vehicle via trailer. The system utilizes an airbag, which can be deflated to a relatively flat condition, and support members that can raise the vehicle up to approximately 1 foot. The system includes cradles for lifting a vehicle on one end by forming a cradle around the tires and lifting the cradle. Unfortunately, U.S. Pat. Nos. 5,727,920; 6,843,487; 6,929,249; 7,275,753 and UK Published Specification 1 563 796 are not suitable for semi-trailers.

U.S. Pat. Nos. 4,768,802; 6,290,248; and 6,663,131 disclose dollies which include "fifth-wheel" assemblies for towing semi trailers. The dollies disclosed in these patents have no lifting capability. Unfortunately, none of these devices can be used to lift and enable transport of a semi-trailer with structural damage.

Thus, there is a need for a device for lifting and transporting semi-trailers with compromised structural integrity. There is also a need for a device for use in extricating trailers stuck under bridges and subsequent transport of the semi-trailer, if necessary without resulting in any damage to the wheels or tires of the semi-trailer.

SUMMARY OF THE INVENTION

Briefly, the present invention relates to a dolly for a semi-trailer that has a compromised structure due to a load shift or an accident. The semi-trailer dolly can also be used to extricate a semi-trailer stuck under a bridge without damaging the wheels or tires of the semi-trailer. In accordance with an important aspect of the present invention, the dolly is configured to provide transverse support of a semi-trailer in an area between the rear axles of the semi-trailer and the front of the semi-trailer. More particularly, the dolly is configured to provide a uniform transverse lifting force to a semi-trailer in an area between the rear axles of a semi-trailer and the front of a semi-trailer where a structural failure of the semi-trailer is likely to occur. The semi-trailer dolly includes a removable saddle and a wheeled cart that includes lifting mechanisms. The removable saddle can be removed from the wheeled cart and positioned under the trailer. Tow truck boom winches connected to opposite sides of the saddle can then be used to lift the saddle and thus the trailer to enable the wheeled cart to be put in position under the saddle. Once the wheeled cart is positioned under the saddle, adjustable lifting mechanisms on the wheeled cart enable the height of the saddle to be varied. The lifting mechanisms are then used to level the floor of the semi-trailer and provide support for the floor of the semi-trailer 24 so that the breached semi-trailer can be transported by a tractor. The wheeled cart may include self steering wheels which facilitate transport of the breached semi-trailer by a tractor.

DESCRIPTION OF THE DRAWINGS

These and other advantages of the present invention will be readily understood with reference to the following specification and attached drawing wherein.

DETAILED DESCRIPTION

The present invention relates to a dolly for a semi-trailer that has a compromised structure due to a load shift or an accident. The semi-trailer dolly can also be used to extricate a semi-trailer stuck under a bridge without damaging the wheels or tires of the semi-trailer. In accordance with an important aspect of the present invention, the dolly is configured to provide transverse support of a semi-trailer in an area between the rear axles of the semi-trailer and the front of the semi-trailer. More particularly, the dolly is configured to provide a uniform transverse lifting force to a semi-trailer in an area between the rear axles of a semi-trailer and the front of a semi-trailer where a structural failure of the semi-trailer is likely to occur. The semi-trailer dolly includes a removable saddle and a wheeled cart that includes lifting mechanisms. The removable saddle can be removed from the wheeled cart and positioned under the trailer. Tow truck boom winches connected to opposite sides of the saddle can then be used to lift the saddle and thus the trailer to enable the wheeled cart to be put in position under the saddle. Once the wheeled cart is positioned under the saddle, adjustable lifting mechanisms on the wheeled cart enable the height of the saddle to be varied. The lifting mechanisms are then used to level the floor of the semi-trailer and provide support for the floor of the semi-trailer 24 so that the breached semi-trailer can be transported by a tractor. The wheeled cart may include self steering wheels which facilitate transport of the breached semi-trailer by a tractor.

Figure 12:
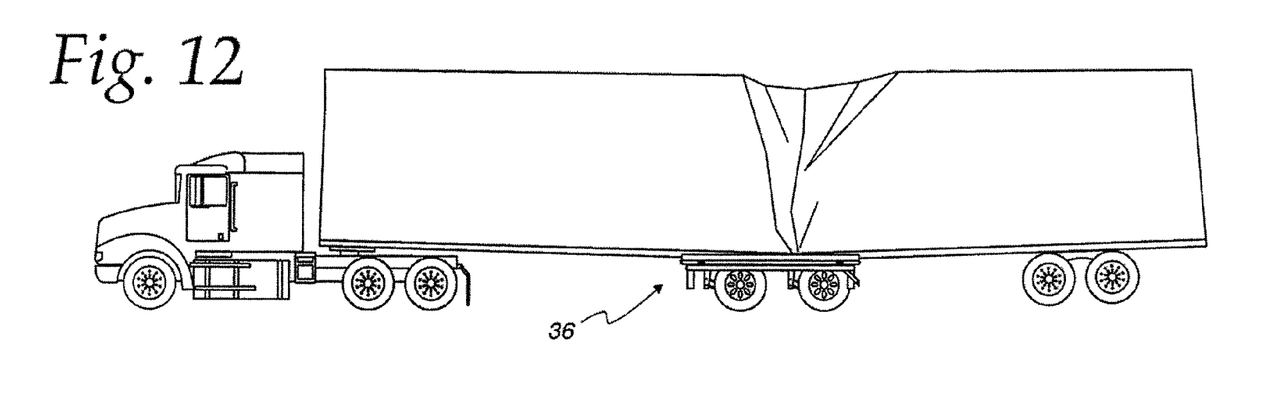
FIG. 12 is similar to FIG. 11 but illustrating the use of the dolly in accordance with the present invention as a support for the damaged portion of the trailer.

Referring first to FIGS. 11 and 12, FIG. 11 illustrates a tractor trailer, generally identified with the reference numeral 20, which includes a tractor or truck 22 and a semi-trailer 24. The semi-trailer 24 includes a pair of rear axles and wheels, identified with the reference numerals 26 and 28. Known semi-trailers 24 do not include a front axle and instead rely on the rear axles 30 and 32 of the tractor 22 for rolling support. Such semi-trailers 24 are known to be coupled to the tractor 22 by way of a "fifth wheel" coupling 34.

Because of weight considerations, such semi-trailers are formed with a uni-body construction in which the roof and the walls are designed to help support the load in order to enable a lighter frame structure under the floor. When the roof and/or sidewalls become damaged, for example, due to an unintended load shift, due to an accident, for example or overloading and even when the semi-trailer gets stuck under a low bridge, such damage reduces the ability of the semi-trailer 24 ability to provide nominal support causing failure of the semi-trailer 24. In response to such a condition, the semi-trailer 24 is likely to fail between tits rear axles 26, 28 and the rear axles 30 and 32 of the tractor 22, as generally shown in FIG. 11.

As will be discussed in detail below, the semi-trailer dolly in accordance with the present invention, generally identified with the reference numeral 36, can be positioned under the semi-trailer 24 at a point where a breach in the floor has occurred, i.e at a point 38 where the floor of the semi-trailer 24 buckled, as generally illustrated in FIG. 12. Once the semi-trailer dolly 36 is properly positioned under the semi-trailer 24, the semi-trailer 24 can be moved from the scene of the breach by the tractor 22 to a safe off the road location to transfer the contents of the breached semi-trailer 24 to another trailer or alternatively to a nearby warehouse.

The semi-trailer dolly 36 includes a wheeled cart 38 and a saddle 40. In situations in which the extent of the breach of the semi-trailer 24 results in the buckled portion of the floor of the semi-trailer 24 being lower than the minimum height of the dolly 36, the saddle can be removed from the dolly 36 and slid under the semi-trailer 24 buckled portion of the floor of the semi-trailer 24. Tow trucks with booms and winches can then be positioned on opposite sides of the semi-trailer dolly 36 and used to lift the saddle to a height sufficient to position the wheeled cart beneath the saddle. Air springs located on the wheeled cart are used for providing vertical lift. These air springs are then extended under the influence of a pressurized air supply to raise the height of the saddle to a height to level the floor of the semi-trailer 24, as generally illustrated in FIG. 12 to provide rolling support for the load in the breached semi-trailer 24 to enable transport of the breached semi-trailer 24 by the tractor 22.

As mentioned above and as best shown in FIG. 2, the semi-trailer dolly 36 is a two-piece device and includes a wheeled cart 38 and a removable saddle 40. The wheeled cart 38 includes a generally rectangular frame 42 coupled to at least one or more axles 44 and 46. The rectangular frame 42 includes two generally elongated frame members 43 and 45 and two shorter frame members 47 and 49. The length of the elongated frame members 43 and 45 is selected to be longer than the wheel base of the axles 44 and 46. The length of the shorter frame members is selected to provide stable support for a saddle that can be used to provide transverse support of a standard 102 inch wide semi-trailer.

The rectangular frame 42 is carried by two axles 44 and 46. A plurality of wheel assemblies 48, 50, 52 and 54 are rotatably coupled to the axles 44 and 46. As shown, the wheel assemblies 48, 50, 52 and 54 are connected directly to the axles 44 and 46 and offer no steering capability. Alternately, steerable axles could be provided for the axles 44 and 46, for example, as described in detail in U.S. Pat. Nos. 4,768,802 and 6,820,887, hereby incorporated by reference. In yet other contemplated embodiments, self steering wheel assemblies could be provided for the wheel assemblies 48, 50, 52 and 54, for example as described in detail in U.S. Pat. No. 4,770,430, hereby incorporated by reference. In such an embodiment, the wheel assembly pairs 48, 50 and 52, 54 may be interconnected by way of tie rods (not shown) so that the each pair of wheel assemblies 48, 50 and 52, 54 steer together.

Figure 5:
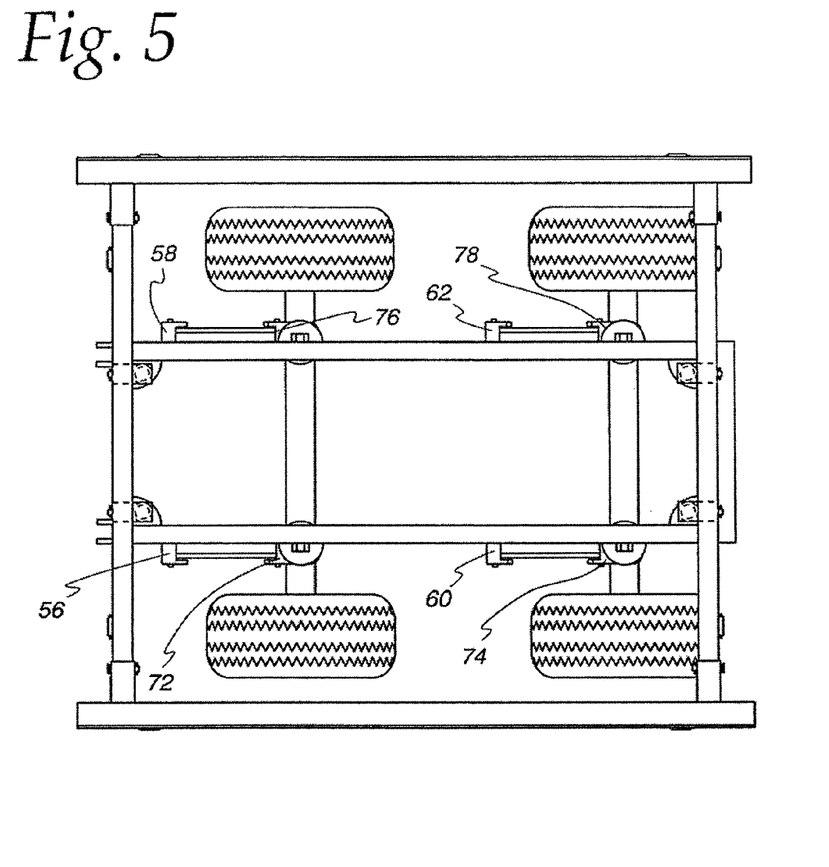
FIG. 5 is a top plan view of the dolly illustrated in FIG. 1.
Figure 7:
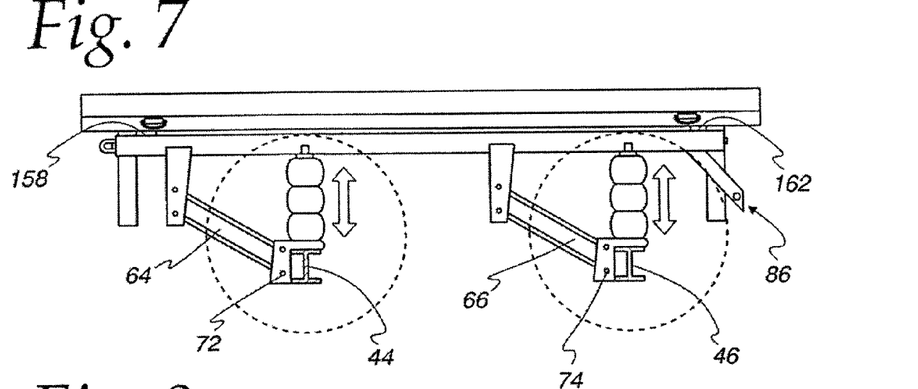
FIG. 7 is a partial side elevational view of the dolly illustrated in FIG. 1, shown with the wheels removed, illustrating a first set of air springs in an expanded position and a second set of air springs in a relaxed position.
Figure 8:
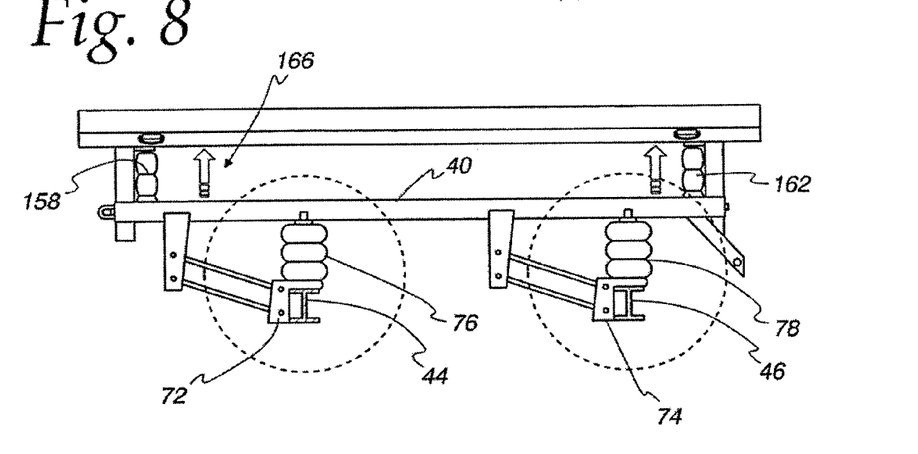
FIG. 8 is a partial side elevational view of the dolly illustrated in FIG. 1, shown with the wheels removed, illustrating a first set of air springs in a relaxed position and a second set of air springs in an expanded position.

Referring to FIGS. 7 and 8, the axles 44 and 46 are attached to the rectangular frame 42 by way of a plurality of vertical arms 56, 58, 60 and 62 (FIG. 2); a plurality of swing arms 64, 66 (FIGS. 7 and 8), 68 and 70 (FIG. 2) and a plurality of brackets 72, 74, 76 and 78 (FIG. 5). As best shown in FIGS. 7 and 8, the swing arms 64, 66, 68 and 70 are pivotally mounted to the vertical arms 56, 58, 60, and 62. Lifting mechanisms, such as air springs 76, 78, 80 and 82 (FIG. 2), are securely disposed between the brackets 72, 74, 76 and 78 (FIG. 5) and the elongated frame members 43 and 45 (FIG. 2).

FIG. 8 illustrates a relaxed position for the air springs 76, 78, 80 and 82, i.e a condition in which the air springs 76, 78, 80 and 82 (FIG. 2) are subject to minimal air pressure. FIG. 7 illustrates an extended position for the air springs 76, 78, 80 and 82, i.e a condition in which the air springs 76, 78, 80 and 82 (FIG. 2) have been pressurized by a source of external air pressure (not shown). These air springs 76, 78, 80 and 82 (FIG. 2) allow the height of the generally rectangular frame 42 (FIG. 2) to be varied with respect to the axles 44 and 46 (FIGS. 7 and 8). More particularly, in a relaxed position as shown in FIG. 8, the distance between the axles 44 and 46 and the generally rectangular frame 42 (FIG. 2) is minimal. As shown in FIG. 7, when the air springs 76, 78, 80 and 82 are fully extended, as indicated by the arrow 84, the distance between the axles 44 and 46 and the generally rectangular frame 42 (FIG. 2) is increased. As such the air springs 76, 78, 80 and 82 serve as one lifting mechanism and in some embodiments of the invention may be the only lifting mechanism.

Figure 1:
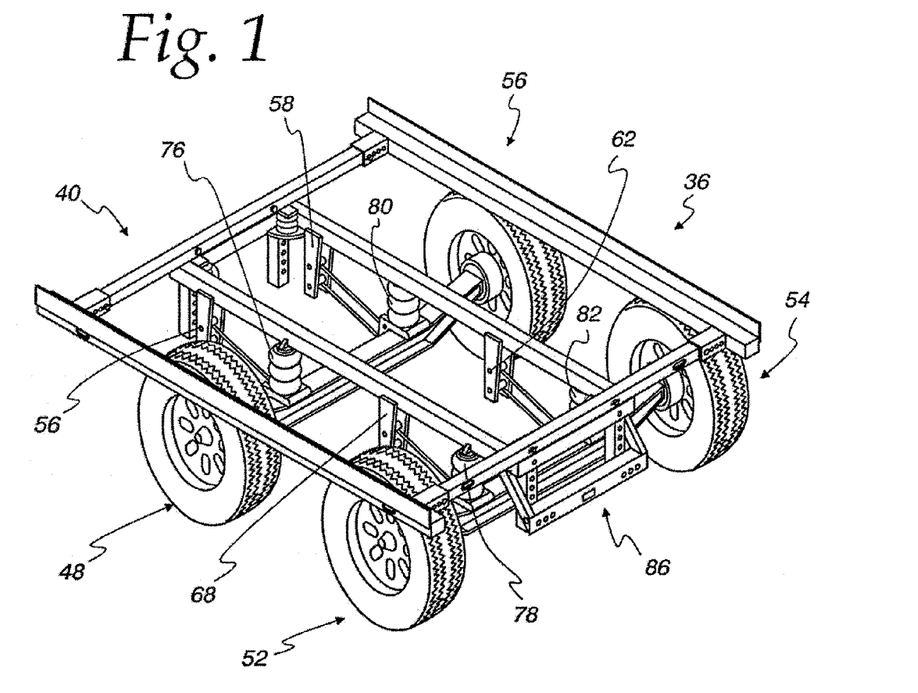
FIG. 1 is a three dimensional view of a semi-trailer dolly in accordance with the present invention.
Figure 2:
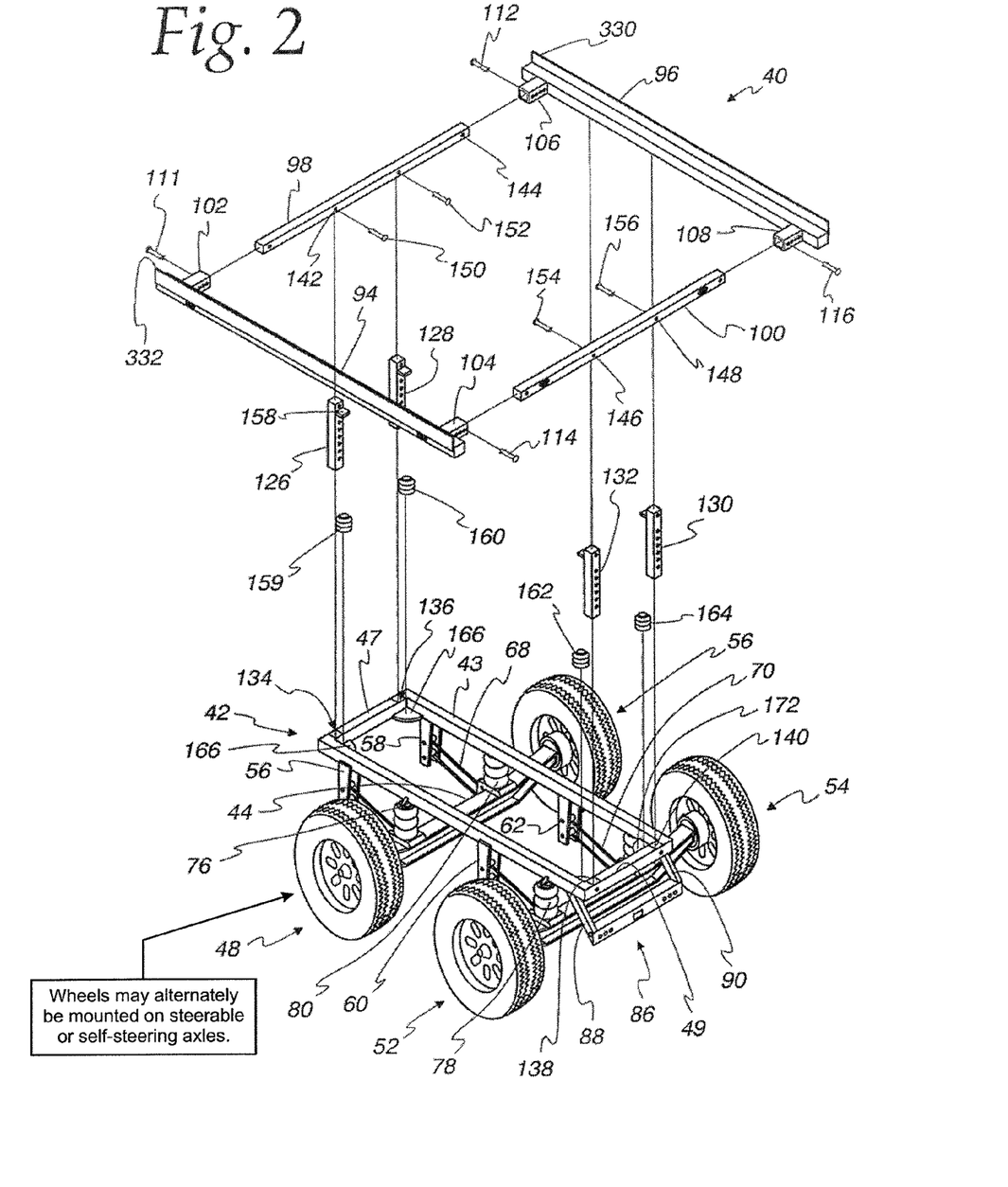
FIG. 2 is an exploded three dimensional view of the dolly illustrated in FIG. 1.
Figure 4:
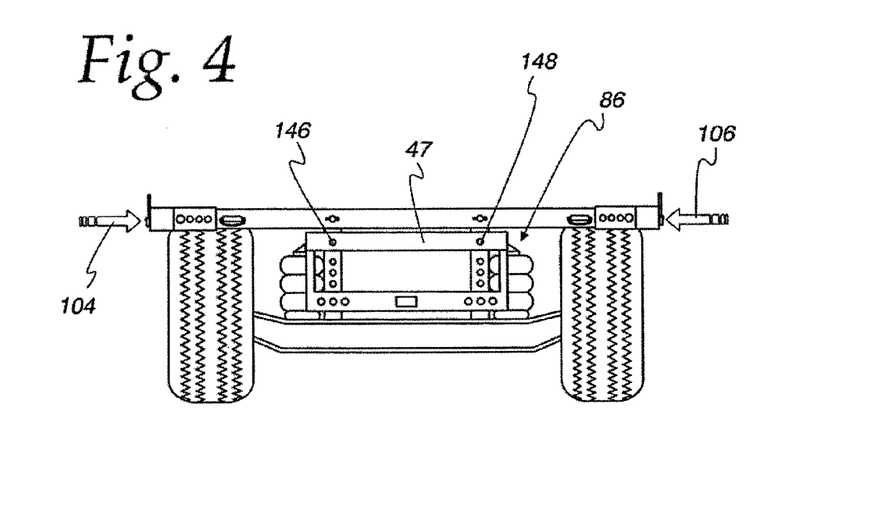
FIG. 4 is a front elevational view of the dolly illustrated in FIG. 1.

The wheeled cart 38 may also include a bumper 86 (FIGS. 2 and 4). The bumper is attached to one of the shorter frame members 47, 49 of the generally rectangular frame 42. As shown in FIG. 2, the bumper 86 is fixedly attached to the frame member 49 by way of a pair of spaced apart brackets 88 and 90. The bumper 86 may be used carry tail lights, generally indicated with the reference numeral 92, which can be used in the event the semi-trailer's tail lights and/or electrical system are damaged or are not operational. The bumper 86 can also be used to carry one or more electrical connectors that can be connected on one end to temporary lights (not shown) on the back of the semi-trailer 24.

As mentioned above, in accordance with an important aspect of the invention, the semi-trailer dolly 36 includes a removable saddle 40 (FIG. 2). The saddle 40 is formed as a generally rectangular or square frame which includes a plurality of frame members 94, 96, 98 and 100. The saddle frame may be formed to be adjustable in a transverse direction, i.e. a direction parallel to the axles 44 and 46, as well as a vertical direction, i.e. perpendicular to the axles 44 and 46, with respect to the wheeled cart 38. Alternately, the saddle frame 40 may include the capability for no adjustment or adjustment in one or the other of the transverse direction or vertical direction.

Figure 3:
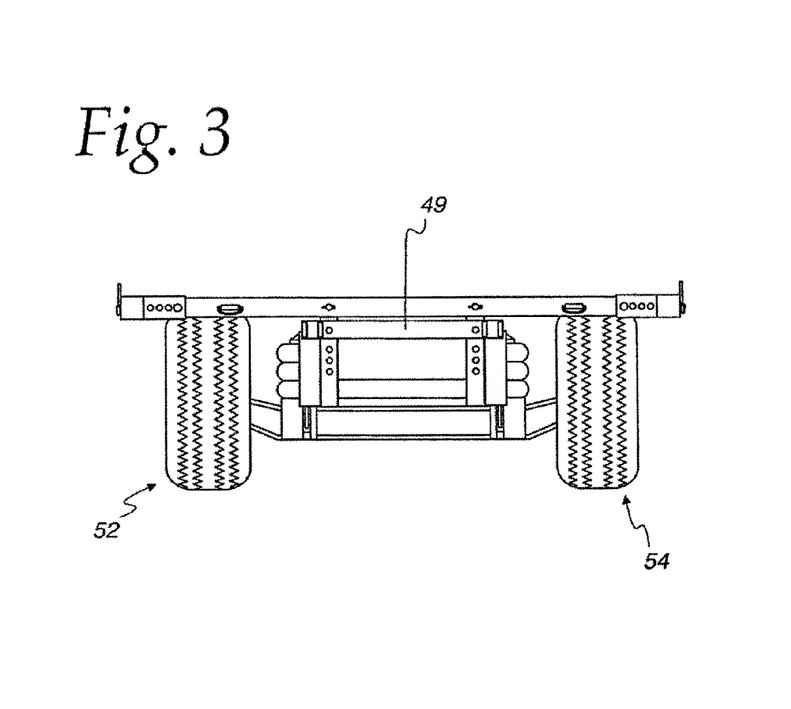
FIG. 3 is a rear elevational view of the dolly illustrated in FIG. 1.

In embodiments which incorporate adjustments of the width of the saddle frame 40, two of the oppositely disposed and spaced apart frame members 94 and 96 (FIG. 2) are provided with adjustment bars 102, 104, 106 and 108, which, in conjunction with the frame members 98 and 100, enable the width of the saddle 40 to be adjusted, as illustrated in FIGS. 3 and 4. More particularly, FIG. 3 illustrates a condition in which the width of the saddle 40 is expanded, for example, with respect to the wheel assemblies 52 and 54 while FIG. 4 illustrates a condition in which the width of the saddle 40 is compressed with respect to the wheel assemblies 52 and 54, as indicated by the arrows 104 and 106.

These adjustment bars 102, 104, 106 and 108 (FIG. 2) may be secured adjacent opposing ends of the spaced apart frame members 94 and 96 so as to be generally parallel to the axles 44 and 46, as best shown in FIG. 2. As shown, each of the adjustment bars 102, 104, 106 and 108 includes a plurality of apertures, generally identified with the reference numeral 110. As mentioned above, the adjustment bars 102, 104, 106 and 108 cooperate with the saddle frame members 98 and 100 to provide adjustment of the width of the saddle 40, as discussed above. More particularly, the adjustment bars 102, 104, 106 and 108 may be formed with a hollow cross-section to enable mating with the frame members 98 and 100. As shown, the adjustment bars 102, 104, 106 and 108 are formed with a generally rectangular cross-section slightly larger than the cross-section of the saddle frame members 98 and 100 to allow the ends of the saddle frame members 98 and 100 to be received, as best shown in FIG. 5. Fasteners or pins 111, 112, 114 and 116 may be used to securely couple the saddle members 98 and 100 to the adjustment bars 102, 104, 106 and 108 to form a saddle at the desired width.

Figure 10:
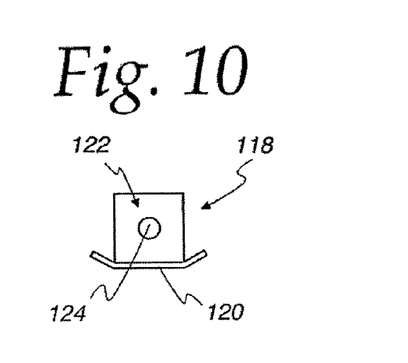
FIG. 10 is an elevational view of a device that allows a saddle portion of the dolly illustrated in FIG. 1 to be slid or dragged under a semi-trailer.

In situations where the extent of the breach of the semi-trailer 24 is such that the saddle 40 must be removed and placed under the floor of the semi-trailer 24, the saddle 40 may be slid into place. In order to prevent wear and damage to the saddle 40 and to facilitate positioning of the saddle 40 under the semi-trailer 24, "shoes" 118 (FIG. 10), may be removably connected to the saddle 40. In particular, each shoe 118 includes slide surface 120 and a vertical bracket 122. The vertical bracket 122 includes an aperture 124. The shoe 118 can be removably connected to the saddle 40. More particularly, the shoe 118 can be connected to the adjustment bars 102, 104, 106 and 108 (FIG. 2) by way of the pins 102, 104, 106 and 108 or additional pins (not shown).

As mentioned above, the saddle 40 is carried by the wheeled cart 38. In embodiments in which the initial height of the saddle 40 is adjustable with respect to the rectangular frame 42 of the wheeled cart 38, vertical adjustment bars 126, 128, 130 and 132 are provided. These adjustment bars 126, 128, 130 and 132 are received in apertures 134, 136, 138 and 140 formed in the shorter frame members 47 and 49 of the rectangular frame 42, forming a portion of the wheeled cart 38. The configuration allows the vertical adjustment bars 126, 128, 130 and 132 to be coupled to the frame members 98 and 100 of the saddle 40 at a desired height and secured thereto by way of pins 150, 152, 154 and 156 (FIG. 2). In the embodiment shown, the adjustment bars 126, 128, 130 and 132 are free to move up and down in the apertures 134, 136, 138 and 140 formed in the shorter frame members 47 and 49 of the rectangular frame 42, forming a portion of the wheeled cart 38. Each of the vertical adjustment bars 126, 128, 130 and 132 may include a stop, generally identified with the reference numeral 158. The stops 158 may be used to limit downward movement of the vertical adjustment bars 126, 128, 130 and 132 within the apertures 134, 136, 138 and 140, formed in the shorter frame members 47 and 49 of the wheeled cart 38.

An additional lifting mechanism may be provided to raise the height of the saddle 40 relative to the wheeled cart 38. More particularly, additional air springs 158, 160, 162 and 164 may be provided to adjust the height of the saddle 40 with respect to the frame 42 of the wheeled cart 38 as generally shown in FIGS. 7 and 8. In particular, FIG. 7 illustrates a condition in which the air springs 158, 160, 162 and 164 are in a relaxed position while FIG. 8 indicates a condition in which the air springs 158, 160, 162 and 164 are in an extended position due to the influence of air pressure, as indicated by the arrows 166.

With reference to FIG. 2, the air springs 158, 160, 162 and 164 are securely carried by gusset plates 166, 168, 170 and 172, secured in the corners of the generally rectangular frame 42, forming a portion of the wheeled cart 38. In this embodiment, the air springs 158, 160, 162 and 164 are configured to exert an upward force on the stops 158, discussed above, under the influence of air pressure, as best shown in FIG. 8.

Figure 6:
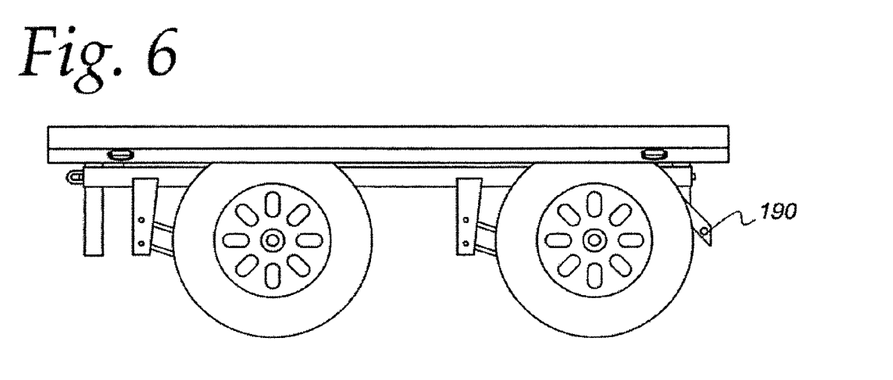
FIG. 6 is a side elevational view of the dolly illustrated in FIG. 1.
Figure 9:
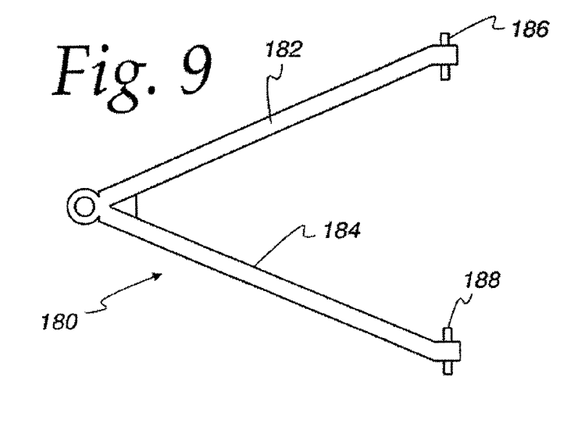
FIG. 9 is a plan view of an exemplary tow bar for use in towing the dolly, illustrated in FIG. 1 into place.

FIG. 9 illustrates an exemplary tow bar 180 that can be used to tow the dolly 36 or just the wheeled cart 38 into place underneath a semi-trailer 24. The tow bar 180 is formed as a wishbone with two dependent legs 182 and 184, joined at one end. The free ends of the of the tow bar 180 may be provided with apertures (not shown) and pins 186 and 188 that enable the tow bar 180 to be coupled to the bumper 86. In particular, the brackets 88 and 90, used to connect the bumper 86 to the rectangular frame 42 may be provided with apertures 190, as best shown in FIG. 6 to enable the tow bar 180 to be coupled to the dolly 36.

Obviously, many modifications and variations of the present invention are possible in light of the above teachings. Thus, it is to be understood that, within the scope of the appended claims, the invention may be practiced otherwise than as specifically described above.

I claim:

1. A dolly for enabling a disabled semi-trailer in which a portion of its floor is structurally breached to be towed by a semi-tractor, the semi-trailer having a set of rear wheels and a front fifth wheel assembly, the dolly comprising:
    a wheeled cart which includes a frame assembly and a pair of axles mechanically coupled to said frame assembly for rotatably carrying wheel assemblies for providing rolling support for the wheeled cart;
    a removable saddle carried on top of said wheeled cart, said saddle including a frame formed to support the width of a semi-trailer when said saddle is carried by said wheeled cart, said saddle including a plurality of vertical adjustment bars for locking the height of the saddle with respect to the wheeled cart,
    an attachment mechanism for removably attaching said removable saddle to said frame of said wheeled cart; and
    a lifting mechanism disposed between said frame of said wheeled cart and said saddle for selectively varying the height of the saddle relative to the wheeled cart to a height in order to enable said wheeled cart and saddle to be disposed underneath the floor of a semi-trailer and enable said breached portion of the floor of said semi-trailer to be raised when said wheeled cart and saddle are disposed underneath said semi-trailer, said wheeled cart and said saddle forming a dolly that is formed to enable said semi-trailer and the dolly to be transported by a semi-tractor when said saddle is in engagement with the underside of a semi-trailer and carried by said wheeled cart, wherein said wheeled cart is formed to enable it to be disposed underneath said portion of the semi-trailer that is structurally breached between said rear wheels and said fifth wheel assembly and wherein said lifting mechanism enables said breached floor to be returned to its original height so that the saddle supports the breached portion of the floor across the width of the trailer so that the disabled semi-trailer can be towed by a semi-tractor in a conventional manner while being supported by the fifth wheel assembly, the set of rear wheels with the wheeled cart providing rolling support under the breached portion of the floor of the trailer.

2. The dolly as recited in claim 1, wherein said at least one axle is non-steerable.

3. The dolly as recited in claim 1, wherein said at least one axle is steerable.

4. The dolly as recited in claim 1, wherein said at least one axle is self steering.

5. The dolly as recited in claim 1, wherein said at least one axle is mounted to a pair of swing arms that are pivotally connected relative to said frame.

6. The dolly as recited in claim 1, wherein said lifting mechanism includes at least one air spring mounted between said at least on axle and said frame.

7. The dolly as recited in claim 5, wherein said swing arms are attached on one end to vertical arms that are rigidly secured to said frame.

8. The dolly as recited in claim 1, further including a second lifting mechanism for lifting said saddle relative to said frame assembly on said wheeled cart.

9. The dolly as recited in claim 8, wherein said second lifting mechanism includes a at least one air spring.

10. The dolly as recited in claim 1, wherein said removable saddle includes a second frame.

11. The dolly as recited in claim 1, wherein said second frame is adjustable in a direction generally parallel to the axis of said at least one axle.

12. The dolly as recited in claim 1, wherein said second frame is adjustable in a vertical direction generally perpendicular to the axis of said at least one axle.

13. The dolly as recited in claim 1, wherein said removable saddle include a shoe attached to said saddle prevents damage to said saddle in applications where said saddle is removed from said wheeled cart and slid under a damaged semi-trailer.

14. The dolly as recited in claim 1, further including a tow bar for towing the wheeled cart.

* * * * *